United States Patent
Karube

(10) Patent No.: US 12,511,868 B2
(45) Date of Patent: Dec. 30, 2025

(54) COLLECTING DEVICE FOR TRAINING DATA

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 383 days.

(21) Appl. No.: 18/187,768

(22) Filed: Mar. 22, 2023

(65) Prior Publication Data
US 2023/0316704 A1 Oct. 5, 2023

(30) Foreign Application Priority Data

Mar. 29, 2022 (JP) .................................. 2022-053072

(51) Int. Cl.
*G06V 10/72* (2022.01)
*G06F 18/15* (2023.01)
(Continued)

(52) U.S. Cl.
CPC .............. *G06V 10/72* (2022.01); *G06F 18/15* (2023.01); *G06F 18/23* (2023.01); *G06F 18/24* (2023.01);
(Continued)

(58) Field of Classification Search
CPC .. G06V 10/72; G06V 10/771; G06V 2201/06; G06V 10/764; G06V 10/82;
(Continued)

(56) References Cited

U.S. PATENT DOCUMENTS 10,929,641 B2 * 2/2021 Rogan ................. G06V 20/698
2022/0012882 A1 * 1/2022 Labiche ................. G16H 20/40
(Continued)

FOREIGN PATENT DOCUMENTS

JP 2009-110064 A 5/2009

OTHER PUBLICATIONS

Wilcoxon, Individual Comparisons by Ranking Methods, Dec. 1945 [retrieved Jun. 5, 2025], Biometrics Bulletin, vol. 1, No. 6, 5 pages. Retrieved: https://sci2s.ugr.es/keel/pdf/algorithm/articulo/wilcoxon1945.pdf (Year: 1945).*

*Primary Examiner* — Henok Shiferaw
*Assistant Examiner* — Dennis Rosario
(74) *Attorney, Agent, or Firm* — Carter, DeLuca & Farrell LLP

(57) ABSTRACT

A first standard deviation $\alpha$ of feature quantities of all pieces of non-expert data stored in a non-expert data storage unit 13 is calculated, and a second standard deviation $\beta$ of feature quantities of all pieces of expert data stored in an expert data storage unit 14 is calculated. In addition, a first rank sum $\xi$ of the feature quantities of all pieces of non-expert data stored in the non-expert data storage unit 13 is calculated, and a second rank sum $\theta$ of the feature quantities of all pieces of expert data stored in the expert data storage unit 14 is calculated. Then, a continuation and an end of acquisition of defective product data by an expert are determined, based on the first standard deviation $\alpha$ and the second standard deviation $\beta$, and the first rank sum $\xi$ and the second rank sum $\theta$.

2 Claims, 3 Drawing Sheets

(51) Int. Cl.
| | |
|---|---|
| *G06F 18/23* | (2023.01) |
| *G06F 18/2321* | (2023.01) |
| *G06F 18/24* | (2023.01) |
| *G06F 18/25* | (2023.01) |
| *G06N 3/02* | (2006.01) |
| *G06N 3/08* | (2023.01) |
| *G06N 20/00* | (2019.01) |
| *G06T 1/00* | (2006.01) |
| *G06T 7/00* | (2017.01) |
| *G06V 10/10* | (2022.01) |
| *G06V 10/70* | (2022.01) |
| *G06V 10/764* | (2022.01) |
| *G06V 10/771* | (2022.01) |
| *G06V 10/82* | (2022.01) |
| *G06V 20/40* | (2022.01) |
| *G06V 20/69* | (2022.01) |
| *G06V 20/70* | (2022.01) |

(52) U.S. Cl.
CPC .............. *G06F 18/254* (2023.01); *G06N 3/02* (2013.01); *G06N 3/08* (2013.01); *G06N 20/00* (2019.01); *G06T 1/0007* (2013.01); *G06T 7/0002* (2013.01); *G06T 7/0004* (2013.01); *G06T 7/0006* (2013.01); *G06T 7/0008* (2013.01); *G06T 7/001* (2013.01); *G06V 10/10* (2022.01); *G06V 10/70* (2022.01); *G06V 10/764* (2022.01); *G06V 10/771* (2022.01); *G06V 10/82* (2022.01); *G06V 20/41* (2022.01); *G06V 20/693* (2022.01); *G06V 20/70* (2022.01); *G06F 18/2321* (2023.01); *G06F 18/24765* (2023.01); *G06T 2207/20081* (2013.01); *G06T 2207/20084* (2013.01); *G06T 2207/30108* (2013.01); *G06T 2207/30156* (2013.01); *G06T 2207/30164* (2013.01); *G06T 2207/30248* (2013.01); *G06T 2207/30252* (2013.01); *G06V 2201/06* (2022.01); *G06V 2201/08* (2022.01)

(58) Field of Classification Search
CPC ...... G06V 10/70; G06V 10/774; G06V 20/41; G06V 40/172; G06V 10/10; G06V 20/698; G06V 20/693; G06V 10/765; G06V 10/7796; G06V 10/809; G06V 2201/08; G06V 20/70; G06V 20/35; G06N 3/08; G06N 20/00; G06N 3/02; G06N 3/047; G06N 7/01; G06N 3/0464; G06T 2207/20081; G06T 2207/20084; G06T 7/0002; G06T 7/0004; G06T 7/0008; G06T 7/001; G06T 7/0006; G06T 2207/30164; G06T 5/60; G06T 1/0007; G06T 2207/20076; G06T 2207/30108; G06T 2207/30156; G06T 2207/30141; G06T 2207/30136; G06T 2207/30116; G06T 2207/30148; G06T 2207/30144; G06T 2207/30152; G06T 2207/30161; G06T 2207/30132; G06T 2207/30121; G06T 2207/30124; G06T 2207/30128; G06T 2207/30112; G06T 2207/30248; G06T 2207/30268; G06T 2207/30252; G06T 2207/30256; G06T 2207/30261; G06T 2207/30264; G06F 18/24; G06F 18/2415; G06F 18/24155; G06F 18/214; G06F 18/15; G06F 18/23; G06F 18/24765; G06F 18/254; G06F 18/285; G06F 18/2321

See application file for complete search history.

(56) References Cited

U.S. PATENT DOCUMENTS

| | | | |
|---|---|---|---|
| 2022/0108195 A1* | 4/2022 | Kehler | .................... G06T 15/08 |
| 2023/0281791 A1* | 9/2023 | Hyatt | ................... G06V 10/764 |
| | | | 382/141 |

* cited by examiner

COLLECTING DEVICE FOR TRAINING DATA

BACKGROUND

Technical Field

The present invention relates to a collecting device for training data for use in learning by an inspection device or the like having a machine learning function that uses a neural network.

Related Art

In recent years, with an inspection device having a machine learning function that uses a neural network, progress has been made on the development of automation technology in an inspection operation for determining whether inspected objects such as various types of industrial products or parts are each a normal product (non-defective product) or an abnormal product (defective product). In the inspection device as described above, learning is performed by reading many pieces of image data of appearances of the inspected objects that have been classified as the non-defective products and the defective products. Then, the inspection device that has learned classification criteria becomes capable of classifying a new inspected object that has been imaged by a camera as a non-defective product or a defective product.

As described above, in the learning by the inspection device, image data of the non-defective product and image data of the defective product are used. In order to improve inspection accuracy, many pieces of image data are necessary for both the non-defective product and the defective product. However, in a manufacturing site of industrial products and the like, in general, the products are manufactured to produce defective products as few as possible, Hence, there are a lot of non-defective products, whereas there are a very few defective products. For this reason, it is more difficult to collect the image data of the defective product (hereinafter, referred to as "defective product data") than the image data of the non-defective product (hereinafter, referred to as "non-defective product data"), which is relatively easily collectable.

In addition, the defective product data includes data to be selected by an expert such as a skilled person or an operator with long years of experience (hereinafter, referred to as "expert data"), and data to be selected by a non-expert such as a new newcomer or an operator with short years of experience (hereinafter, referred to as "non-expert data"). As a device caused to learn the above-described expert data and non-expert data so as to generate a learning model, for example, the device described in JP 2009-110064 A is known.

In JP 2009-110064 A, "expert data" is defined as training data to which a label is applied by an expert with abundant knowledge and experience, and labeling accuracy (reliability) is high, whereas "non-expert data" is defined as training data to which a label is applied, but its accuracy (reliability) is unclear. In addition, a reliability degree is given to the non-expert data with reference to the expert data. Then, a learning model as a classification model is generated by performing learning using the expert data and the non-expert data applied with the reliability degree.

SUMMARY

In the above-described conventional learning model generation method, although the quality of the non-expert data itself is evaluated to some extent, it cannot be said that the quality or amount of the expert data itself is appropriately evaluated. For this reason, in the learning model that has been generated by use of the expert data and the non-expert data applied with the reliability degree, in a case where the quality or the amount of the expert data itself is not sufficient, the classification accuracy of the learning model will decrease. In addition, collection of the expert data usually takes cost more than collection of the non-expert data. Hence, in a case where there is an amount of the expert data more than necessary, this will lead to an increase in the generation cost of the learning model.

The present invention has been made to address such drawbacks, and has an object to provide a collecting device for training data to be capable of collecting training data for generating a learning model with high classification accuracy, while minimizing expert data.

In order to achieve the above object, according to a first aspect of the present invention, a collecting device for training data that collects defective product data including an external appearance image of an inspected object to be an abnormal product, as the training data for use in learning by a predetermined learning model, the collecting device includes: a non-expert defective product data acquisition unit configured to acquire the defective product data in accordance with a selection by a non-expert; an expert defective product data acquisition unit configured to acquire the defective product data in accordance with a selection by an expert; a non-expert data storage unit configured to store, as non-expert data, the defective product data that has been acquired by the non-expert defective product data acquisition unit; an expert data storage unit configured to store, as expert data, the defective product data that has been acquired by the expert defective product data acquisition unit; a first standard deviation calculation unit configured to calculate, as a first standard deviation, a standard deviation of feature quantities of all pieces of the non-expert data stored in the non-expert data storage unit; a second standard deviation calculation unit configured to calculate, as a second standard deviation, a standard deviation of feature quantities of all pieces of the expert data stored in the expert data storage unit; a first rank sum calculation unit configured to calculate, as a first rank sum, a rank sum of the feature quantities of all pieces of the non-expert data stored in the non-expert data storage unit; a second rank sum calculation unit configured to calculate, as a second rank sum, a rank sum of the feature quantities of all pieces of the expert data stored in the expert data storage unit; and a determination unit configured to determine a continuation and an end of acquisition of the defective product data by the expert defective product data acquisition unit, based on the first and second standard deviations and the first and second rank sums.

According to this configuration, in a case where the collecting device for training data collects the defective product data of the inspected object as the training data, the non-expert defective product data acquisition unit acquires the defective product data in accordance with the selection by the non-expert, and the defective product data is stored as the non-expert data in the non-expert data storage unit. In addition, the expert defective product data acquisition unit acquires the defective product data in accordance with the selection by the expert, and the defective product data is stored as the expert data in the expert data storage unit.

The above non-expert denotes a newcomer, an operator, or the like with short years of experience in the inspection operation, and the non-expert data selected by such a non-expert includes an image of a defective product that is relatively likely to occur. For this reason, in a case where a large amount of non-expert data that has been collected is converted into values obtained by extracting features from the respective defective product images, that is, converted into feature quantities, the distribution is in a state concentrated in the vicinity of the average value, and the standard deviation becomes small. In the present invention, the standard deviation of the feature quantities of all pieces of non-expert data stored in the non-expert data storage unit are calculated as the first standard deviation.

On the other hand, the expert denotes a skilled person, an operator, or the like with long years of experience in the inspection operation, and the expert data selected by such an expert includes all defective product images from a defect that is relatively likely to occur to a defect that occurs once in several years. Therefore, in a case where many pieces of expert data that have been collected are converted into feature quantities, the distribution is in a state evenly spreading out as a whole, and the standard deviation becomes large, unlike the non-expert data. In the present invention, the standard deviation of the feature quantities of all pieces of expert data stored in the expert data storage unit are calculated as the second standard deviation.

In addition, regarding a large amount of non-expert data that has been collected, for example, even though most pieces of them are concentrated in the vicinity of the average value, if there is a single piece of data that is a large outlier, the standard deviation will become large. In general, pieces of training data with high quality that are optimal for learning by a learning model desirably spread out evenly from the average to outliers. For this reason, the feature quantities of all pieces of non-expert data are ranked in ascending order from a small value to a large value, and its rank sum is calculated as the first rank sum. On the other hand, the rank sum of the feature quantities of all pieces of expert data are calculated as the second rank sum.

The determination unit determines a continuation and an end of acquisition of the defective product data by the expert defective product data acquisition unit, based on the first and second standard deviations and the first and second rank sums that have been calculated as described above. Specifically, for example, in a case where the ratio between the first and second standard deviations (standard deviation ratio) is equal to or greater than a predetermined reference value, it can be determined that the training data that covers all defective product images has been collected as the expert data. In addition, when the ratio between the first and second rank sums (rank sum ratio) is equal to or greater than a predetermined reference value, it can be determined that the training data sufficiently including data to be regarded as outliers in the non-expert data has been collected as the expert data. Therefore, by determining the continuation and the end of the acquisition of the defective product data selected by the expert by use of the standard deviation ratio and the rank sum ratio, it is possible to collect the training data for generating the learning model with high classification accuracy, while minimizing the expert data.

According to a second aspect of the present invention, in the collecting device for the training data described in the first aspect, in a case where $\alpha$ denotes the first standard deviation, $\beta$ denotes the second standard deviation, $\xi$ denotes the first rank sum, and $\theta$ denotes the second rank sum, the determination unit determines the end of the acquisition of the defective product data by the expert defective product data acquisition unit, in a case where a determination coefficient Vrank calculated in a following expression (1) is equal to or greater than a predetermined value.

[Expression 1]

$$Vrank = 1 - \frac{1}{\left(\frac{\beta}{\alpha}\right)^2 \times \left(\frac{\theta}{\xi}\right)^2} \qquad (1)$$

According to this configuration, the determination coefficient Vrank calculated by use of the standard deviation ratio ($\beta/\alpha$) between the first standard deviation $\alpha$ and the second standard deviation $\beta$ and the rank sum ratio ($\xi/\theta$) between the first rank sum $\xi$ and the second rank sum $\theta$ approaches 1 in value, as the standard deviation ratio and the rank sum ratio increase. When the determination coefficient Vrank becomes equal to or greater than a predetermined value, it becomes possible to determine that the non-expert data and the expert data that have been collected as the training data are not concentrated in the vicinity of the average in the entire data and are in an appropriately distributed state.

DETAILED DESCRIPTION

Figure 1:
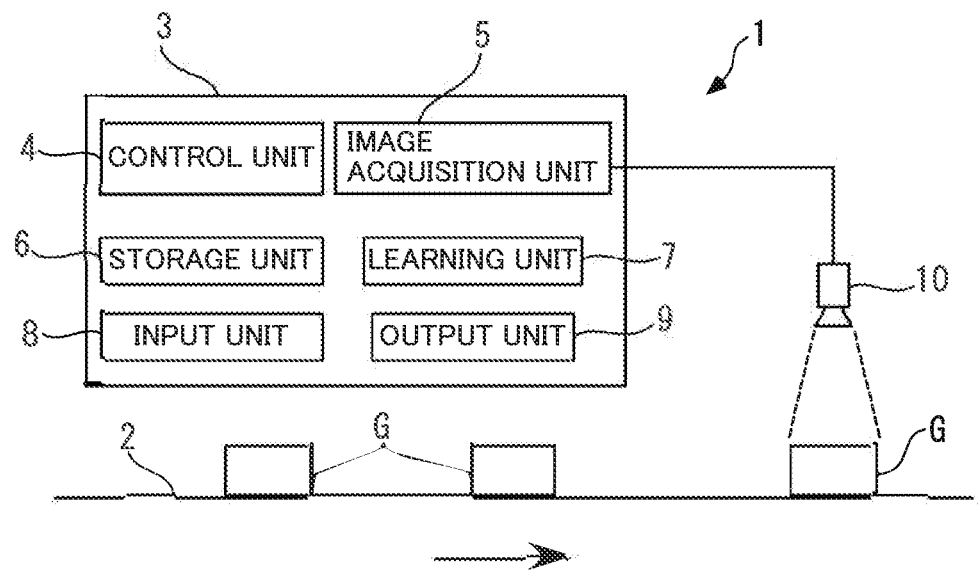
FIG. 1 is a diagram for describing an outline of an inspection system in which training data that has been collected by a collecting device for training data according to an embodiment of the present invention is used for learning.

Hereinafter, preferred embodiments of the present invention will be described in detail with reference to the drawings. FIG. 1 illustrates an inspection system including a learning model by which learning has been performed by use of data of a large number of defective product images (defective product data) that has been collected by a collecting device 11 for training data to be described later and data of a large number of non-defective product images (non-defective product data). Such an inspection system 1 is installed in, for example, a manufacturing factory of vehicle components, and by inspecting the appearance of a vehicle component, automatically determines whether a manufactured vehicle component (for example, a cylinder block) is a normal product (non-defective product) or an abnormal product (defective product). Hereinafter, a vehicle component to be inspected will be referred to as an "inspected object".

As illustrated in FIG. 1, the inspection system 1 includes a conveyor 2 for conveying an inspected object G in a predetermined direction at a predetermined speed, and an inspection device 3 for determining the quality of the inspected object G, when the inspected object G reaches a predetermined inspection position. Note that the illustration is omitted, but the inspected object G that has been determined to be a defective product by the inspection device 3 is removed from the conveyor 2, or is conveyed to a storage place dedicated to the defective products.

The inspection device 3 is configured with an information processing device mainly including a computer, and includes a control unit 4, an image acquisition unit 5, a storage unit 6, a learning unit 7, an input unit 8, an output unit 9, and a camera 10.

The control unit 4 includes a CPU, and controls the above respective units 5 to 9 of the inspection device 3, and the camera 10. The image acquisition unit 5 acquires, as digital data, an external appearance image of the inspected object G that has been imaged by the camera 10. The storage unit 6 includes a ROM and a RAM, stores various programs to be used in the control of the inspection device 3, and also stores various types of data. The learning unit 7 includes a learning model by which criteria for determining the quality of the inspected object G have been learned. The input unit 8 includes a keyboard and/or a mouse to be operated by an operator, and in addition, is configured so that data and/or signals can be input from the outside. The output unit 9 includes a display device such as a display on which a determination result of the inspected object G is displayed.

Figure 2:
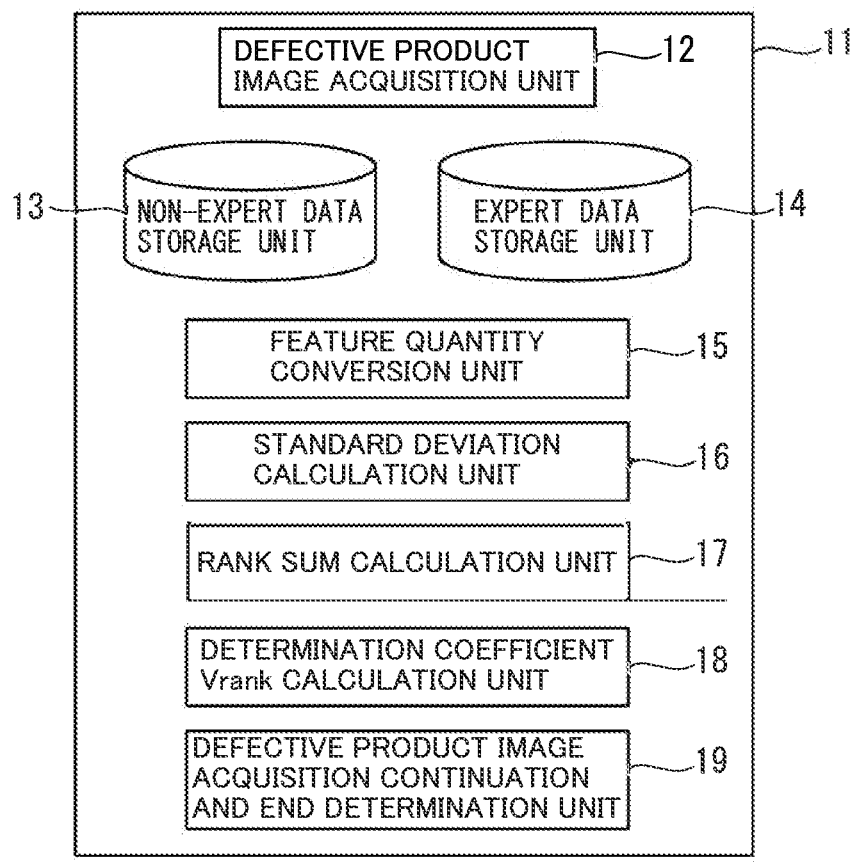
FIG. 2 is a block diagram illustrating the collecting device for training data according to an embodiment of the present invention.

FIG. 2 illustrates a collecting device 11 for training data according to an embodiment of the present invention. The collecting device 11 for training data is operated by an operator who performs an inspection operation of the inspected object G so as to collect defective product data. Similarly to the inspection device 3 described above, the collecting device 11 for training data is configured with an information processing device including a computer, and includes a defective product image acquisition unit 12 (non-expert defective product data acquisition unit, expert defective product data acquisition unit), a non-expert data storage unit 13, an expert data storage unit 14, a feature quantity conversion unit 15, a standard deviation calculation unit 16 (first standard deviation calculation unit, second standard deviation calculation unit), a rank sum calculation unit 17 (first rank sum calculation unit, second rank sum calculation unit), a determination coefficient Vrank calculation unit 18, and a defective product image acquisition continuation and end determination unit 19 (determination unit).

Regarding an external appearance image of the inspected object G that has been imaged by a camera similar to the camera 10 of the inspection device 3 described above, the defective product image acquisition unit 12 acquires, as defective product data, the external appearance image that has been determined to be a defective product by the operator.

The non-expert data storage unit 13 stores defective product data (non-expert data) that has been selected by non-experts (newcomers or operators with short years of experience in the inspection operation). On the other hand, the expert data storage unit 14 stores defective product data (expert data) that has been selected by experts (skilled persons or operators with long years of experience in the inspection operation).

The feature quantity conversion unit 15 converts the defective product data into a predetermined feature quantity. Specifically, the defective product data is converted into the feature quantity by use of, for example, scale-invariant feature transform (SIFT) or convolution neural network (CNN).

The standard deviation calculation unit 16 calculates a standard deviation of feature quantities for many pieces of defective product data respectively stored in the non-expert data storage unit 13 and the expert data storage unit 14. In addition, the rank sum calculation unit 17 calculates a rank sum of the feature quantities for many pieces of defective product data described above.

As will be described later, the determination coefficient Vrank calculation unit 18 calculates a determination coefficient Vrank for determining a continuation or an end of acquisition of the defective product image by using four parameters including a standard deviation and a rank sum of the non-expert data and a standard deviation and a rank sum of the expert data.

The defective product image acquisition continuation and end determination unit 19 determines whether to continue or end the acquisition of the defective product image in accordance with the determination coefficient Vrank that has been calculated.

Figure 3:
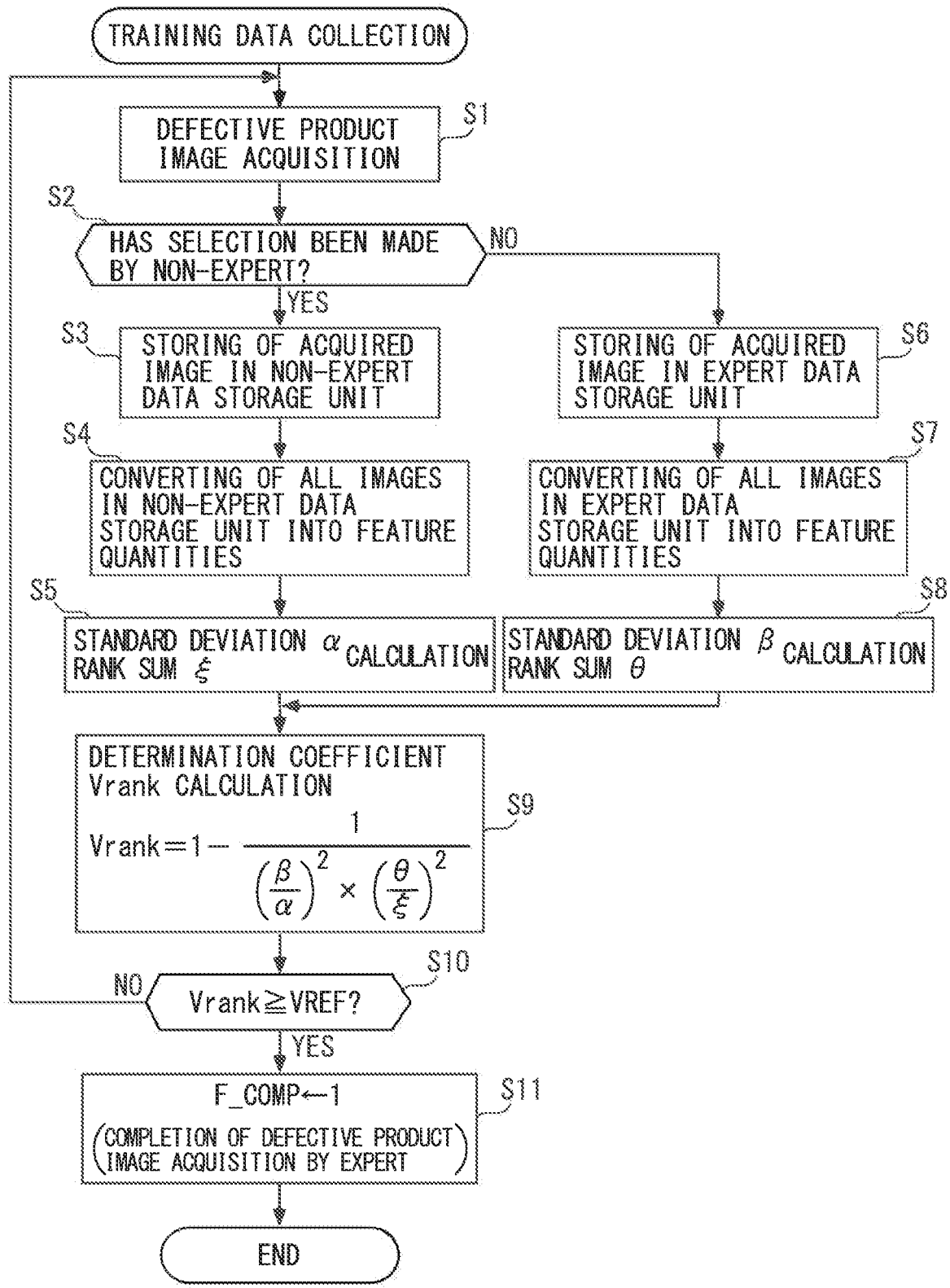
FIG. 3 is a flowchart illustrating collection processing of training data by the collecting device for training data.

FIG. 3 illustrates collection processing of a defective product image serving as training data by the collecting device 11 for training data described above. In the present processing, first, step 1 (indicated as "S1" in the drawing. Hereinafter, the same will apply), a defective product image is acquired.

Next, in step 2, it is determined whether the defective product image that has been acquired is a selection by a non-expert. For example, while a non-expert is operating the collecting device 11 for training data, it is determined that the defective product image that has been acquired is the selection by the non-expert, and while an expert is operating the collecting device 11 for training data, it is determined that the defective product image that has been acquired is the selection by the expert. In a case where a determination result in step 2 is YES, the image that has been acquired is stored in the non-expert data storage unit 13 (step 3). Note that in a case where a non-expert selects a defective product image, and has never seen the selected defective product image before, such a defective product image is regarded as an outlier, and is not stored in the non-expert data storage unit 13 in order to adjust the condition with the expert data.

Next, the feature quantity conversion unit 15 converts all the images in the non-expert data storage unit 13 respectively into feature quantities (step 4). Note that the defective product image other than the defective product image currently stored in the non-expert data storage unit 13 has already been converted into the feature quantity beforehand. Therefore, in step 4, only the defective product image acquired this time is converted into a feature quantity. Then, the standard deviation calculation unit 16 and the rank sum calculation unit 17 respectively calculate a standard deviation $\alpha$ (first standard deviation) and a rank sum $\xi$ (first rank sum), based on the feature quantities of all the images stored in the non-expert data storage unit 13 (step 5).

On the other hand, in a case where the determination result in step 2 is NO and the defective product image acquired this time is the selection by an expert, the acquired image is stored in the expert data storage unit 14 (step 6). Next, all the images in the expert data storage unit 14 are respectively converted into feature quantities in the same manner as in step 4 (step 7). Then, the standard deviation calculation unit 16 and the rank sum calculation unit 17 respectively calculate a standard deviation $\beta$ (second standard deviation) and a rank sum $\theta$ (second rank sum), based on the feature quantities of all the images stored in the expert data storage unit 14 (step 8).

After step 5 or step 8 ends, the determination coefficient Vrank calculation unit 18 uses the four parameters calculated in steps 5 and 8, that is, the standard deviation $\alpha$, the standard deviation β, the rank sum ξ, and the rank sum θ, calculates a determination coefficient Vrank by using a following expression (1).

[Expression 1]

$$Vrank = 1 - \frac{1}{\left(\frac{\beta}{\alpha}\right)^2 \times \left(\frac{\theta}{\xi}\right)^2} \quad (1)$$

The determination coefficient Vrank, which is calculated by use of a standard deviation ratio (β/α) between the standard deviations α and β in the above expression (1) and a rank sum ratio (ξ/θ) between the rank sums ξ and θ, approaches 1 in value, as the standard deviation ratio and the rank sum increase. In a case where the determination coefficient Vrank becomes equal to or greater than a predetermined value VREF to be described later, it becomes possible to determine that the non-expert data and the expert data that have been collected as the training data are not concentrated in the vicinity of the average in the entire data and are in an appropriately distributed state.

In step 10, it is determined whether the determination coefficient Vrank is equal to or greater than the predetermined value VREF. In a case where the determination result is NO and the determination coefficient Vrank is smaller than the predetermined value VREF, it is determined that the expert data has not been sufficiently prepared yet, and the processing returns to step 1 to continue acquiring the defective product image.

On the other hand, in a case where the determination result in step 10 is YES and Vrank≥VREF is satisfied, the expert data has been sufficiently prepared, the collection of the defective product image by the expert should be completed, "1" is set to the expert data acquisition completion flag F_COMP (step 11), and the collection processing for training data ends. Note that by setting "1" to the flag F_COMP, in the collecting device 11 for training data, the collection of the training data having been completed is notified on a display unit, not illustrated, or the like.

Figure 4:
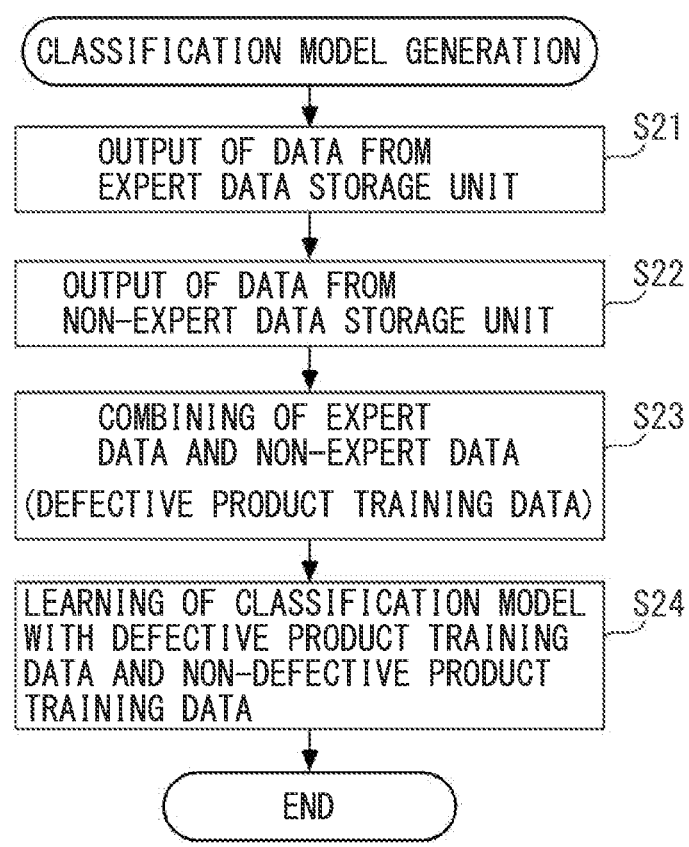
FIG. 4 is a flowchart illustrating generation processing of a classification model.

FIG. 4 illustrates generation processing of a classification model serving as a learning model to be mounted on the learning unit 7 of the inspection device 3 in the inspection system 1 described above. In the present processing, all pieces of data (expert data) are output from the expert data storage unit 14 of the collecting device 11 for training data (step 21), and in addition, predetermined pieces of data (non-expert data) that are all or more than the pieces of expert data are output from the non-expert data storage unit 13 (step 22). Next, the expert data and the non-expert data that have been output are combined (step 23). Accordingly, many pieces of defective product training data to be used for generating the classification model are created.

Then, learning of the classification model is performed by use of many pieces of defective product training data that have been created and many pieces of non-defective product data that have already been collected (non-defective product training data) (step 24). Accordingly, the classification model with high classification accuracy is obtainable, and in the inspection system 1, the quality of the inspected object G can be determined with accuracy.

Heretofore, as described in detail, according to the present embodiment, the continuation and the end of the acquisition of the defective product image to be selected by the expert are determined by use of the standard deviation α and the rank sum ξ based on the feature quantities of the non-expert data and the standard deviation β and the rank sum θ based on the feature quantities of the expert data. Therefore, it is possible to collect the training data for generating the learning model with high classification accuracy, while minimizing expert data.

Note that the present invention is not limited to the above-described embodiments, and can be implemented in various modes. For example, in an embodiment, the continuation and the end of the collection of the defective product image by the expert is determined by use of the determination coefficient Vrank. However, the continuation and the end of the collection of the defective product image by the expert may be determined by respectively comparing the standard deviation ratio (β/α) between the first standard deviation α and the second standard deviation ratio β and the rank sum ratio (θ/ξ) between the first rank sum ξ and the second rank sum θ with predetermined reference values. In addition, the detailed configuration and the like of the collecting device 11 for training data, which have been described in the embodiments are merely examples, and can be appropriately changed within the scope of the gist of the present invention.

What is claimed is:

1. A collecting device for training data that collects defective product data including an external appearance image of an inspected object to be an abnormal product, as the training data for use in learning by a predetermined learning model, the collecting device comprising:
   a processor; and
   a memory, including instructions stored thereon, which when executed by the processor, cause the collecting device to perform the functions of:
   a non-expert defective product data acquisition unit configured to acquire the defective product data in accordance with a selection by a non-expert;
   an expert defective product data acquisition unit configured to acquire the defective product data in accordance with a selection by an expert;
   a non-expert data storage unit configured to store, as non-expert data, the defective product data that has been acquired by the non-expert defective product data acquisition unit;
   an expert data storage unit configured to store, as expert data, the defective product data that has been acquired by the expert defective product data acquisition unit;
   a first standard deviation calculation unit configured to calculate, as a first standard deviation, a standard deviation of feature quantities of all pieces of the non-expert data stored in the non-expert data storage unit;
   a second standard deviation calculation unit configured to calculate, as a second standard deviation, a standard deviation of feature quantities of all pieces of the expert data stored in the expert data storage unit;
   a first rank sum calculation unit configured to calculate, as a first rank sum, a rank sum of the feature quantities of all pieces of the non-expert data stored in the non-expert data storage unit;
   a second rank sum calculation unit configured to calculate, as a second rank sum, a rank sum of the feature quantities of all pieces of the expert data stored in the expert data storage unit;
   a determination unit configured to determine a continuation and an end of acquisition of the defective product data by the expert defective product data acquisition unit, based on the first and second standard deviations and the first and second rank sums, wherein the determination unit is configured to calculate a determination coefficient based on the first and second standard deviations and the first and second rank sums, and to terminate the acquisition of defective product data by the expert defective product data acquisition unit when the determination coefficient is equal to or greater than a predetermined value; and a generation unit configured to generate the learning model as a classification model based on the defective product training data and the non-defective product training data.

2. The collecting device for the training data according to claim 1, wherein in a case where $\alpha$ denotes the first standard deviation, $\beta$ denotes the second standard deviation, $\xi$ denotes the first rank sum, and $\theta$ denotes the second rank sum, the determination unit determines the end of the acquisition of the defective product data by the expert defective product data acquisition unit, in a case where a determination coefficient Vrank calculated in a following expression (1) is equal to or greater than a predetermined value:

[Expression 1]

$$Vrank = 1 - \frac{1}{\left(\frac{\beta}{\alpha}\right)^2 \times \left(\frac{\theta}{\xi}\right)^2}. \qquad (1)$$

\* \* \* \* \*